United States Patent
Doczy et al.

(10) Patent No.: US 7,609,514 B2
(45) Date of Patent: Oct. 27, 2009

(54) ELECTRONIC DEVICE LOCKING SYSTEM

(75) Inventors: Paul J. Doczy, Cypress, TX (US); Earl W. Moore, Cypress, TX (US); Stacy L. Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 11/786,402

(22) Filed: Apr. 11, 2007

(65) Prior Publication Data

US 2008/0253094 A1 Oct. 16, 2008

(51) Int. Cl.
G06F 1/16 (2006.01)
(52) U.S. Cl. .............. 361/679.58; 361/697.55; 312/223.1; 312/223.2
(58) Field of Classification Search ............ 361/679.26, 361/679.58
See application file for complete search history.

(56) References Cited

U.S. PATENT DOCUMENTS

| | | | |
|---|---|---|---|
| 5,205,017 A * | 4/1993 | Wang | 16/367 |
| 6,108,196 A | 8/2000 | Jung | |
| 6,243,819 B1 | 6/2001 | Jung | |
| 6,704,194 B2 | 3/2004 | Koo | |
| 6,762,928 B2 | 7/2004 | Lo | |
| 6,870,740 B2 * | 3/2005 | Hsu et al. | 361/732 |
| 7,420,799 B2 * | 9/2008 | Wang | 361/679.27 |
| 2004/0083441 A1 | 4/2004 | Gweon | |
| 2006/0133019 A1 * | 6/2006 | Yamazaki et al. | 361/683 |

FOREIGN PATENT DOCUMENTS

| | | |
|---|---|---|
| JP | 01-165682 | 11/1989 |
| JP | 06-152157 | 5/1994 |
| JP | 2004-326440 | 11/2004 |
| KR | 2000-0018161 | 10/2000 |
| KR | 2002-0065247 | 8/2002 |

* cited by examiner

Primary Examiner—Jayprakash N Gandhi
Assistant Examiner—Anthony Q Edwards

(57) ABSTRACT

An electronic device locking system, comprising a display member coupled to a base member to enable variable positioning of the display member relative to the base member and a post engagable with a latch to secure the display member in a fixed position relative to the base member.

17 Claims, 5 Drawing Sheets

ELECTRONIC DEVICE LOCKING SYSTEM

BACKGROUND

Electronic devices, such as laptop or notebook computers, generally comprise hook-style latch designs operable to engage a locking mechanism to secure a rotatable display member to a base member (e.g., in a closed position or tablet position). Such latch designs are susceptible to catching and/or otherwise becoming entangled with foreign objects, such as for example, clothing or jewelry, thereby increasing the likelihood of damage to the latch and/or the electronic device. Furthermore, such hook-style latch designs consume excessive space within the electronic devices.

DETAILED DESCRIPTION OF THE DRAWINGS

Various embodiments and the advantages thereof are best understood by referring to FIGS. 1A-3C, like numerals being used for like and corresponding parts of the various drawings.

Figure 1A:
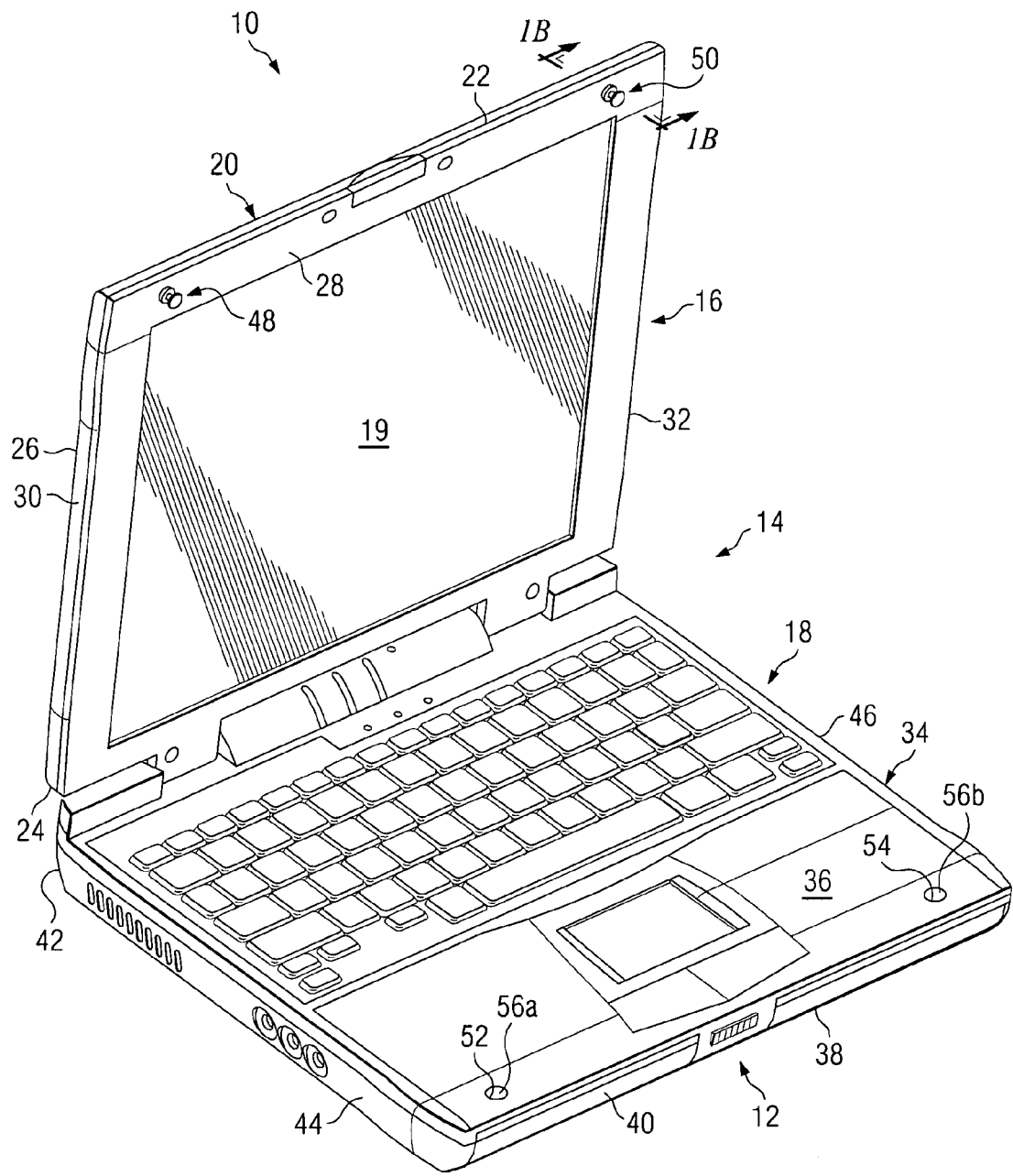
FIG. 1A is a diagram illustrating a perspective view of an electronic device in which an embodiment of a locking system is employed to advantage.

FIG. 1A is a diagram of an embodiment of an electronic device 10 in which a locking system 12 is employed to advantage. In the embodiment illustrated in FIG. 1A, electronic device 10 comprises a laptop or notebook computer 14; however, it should be understood that electronic device 10 may comprise any type of electronic device such as, but not limited to, a convertible tablet personal computer, a personal digital assistant, or any other type of portable or non-portable computing device having a locking system 12 to secure portions thereof. In the embodiment illustrated in FIG. 1A, electronic device 10 comprises a display member 16 rotatably coupled to a base member 18. Display member 16 may be coupled to base member 18 by a hinge or other element to enable variable positioning of display member 16 relative to base member 18. Display member 16 comprises a display screen 19 supported by a housing 20 formed from a top wall 22, a bottom wall 24, a rear wall 26, a front wall/bezel 28 and a pair of sidewalls 30 and 32. Base member 18 comprises a housing 34 formed by a top wall defining a working surface 36, a bottom wall 38, a front wall 40, a rear wall 42 and a pair of sidewalls 44 and 46.

In the embodiment illustrated in FIG. 1A, locking system 12 comprises a pair of pins or posts 48 and 50 extending outwardly from display member 16 and insertible into corresponding openings 52 and 54, respectively, on working surface 36 to secure display member 16 to base member 18 (e.g., positioned such that display member 16 is adjacent to and otherwise covers working surface 36 of base member 18 such as in a closed position where display screen 19 is disposed adjacent to working surface 36 or in a tablet position where display screen 19 remains exposed for use as a tablet personal computer). In the embodiment illustrated in FIG. 1A, openings 52 and 54 are concealed or otherwise enclosed by caps 56a and 56b, respectively. In some embodiments, caps 56a and 56b are mounted flush (i.e., flush or substantially flush) with working surface 36 and enclose openings 52 and 54, respectively, to prevent debris or other unwanted matter from entering housing 34; however, it should be understood that openings 52 and 54 may be configured without caps 56a and 56b. In FIG. 1A, caps 56a and 56b are retracted and/or otherwise removed from covering openings 42 and 54 in response to insertion of posts 48 and 50 within openings 52 and 54, respectively.

In FIG. 1A, posts 48 and 50 extend outward from bezel 28 and comprise generally circular cross-sectional areas which may vary in dimension along a length of posts 48 and 50; however, it should be understood that posts 48 and 50 may be otherwise configured (e.g., oval, square, triangular cross-sections) and have symmetrical and/or nonsymmetrical cross-sectional areas. In addition, it should be understood that a greater or fewer number of posts 48, 50 and corresponding openings 52, 54 may be utilized secure display member 16 and base member 18 in a closed position.

Figure 1B:
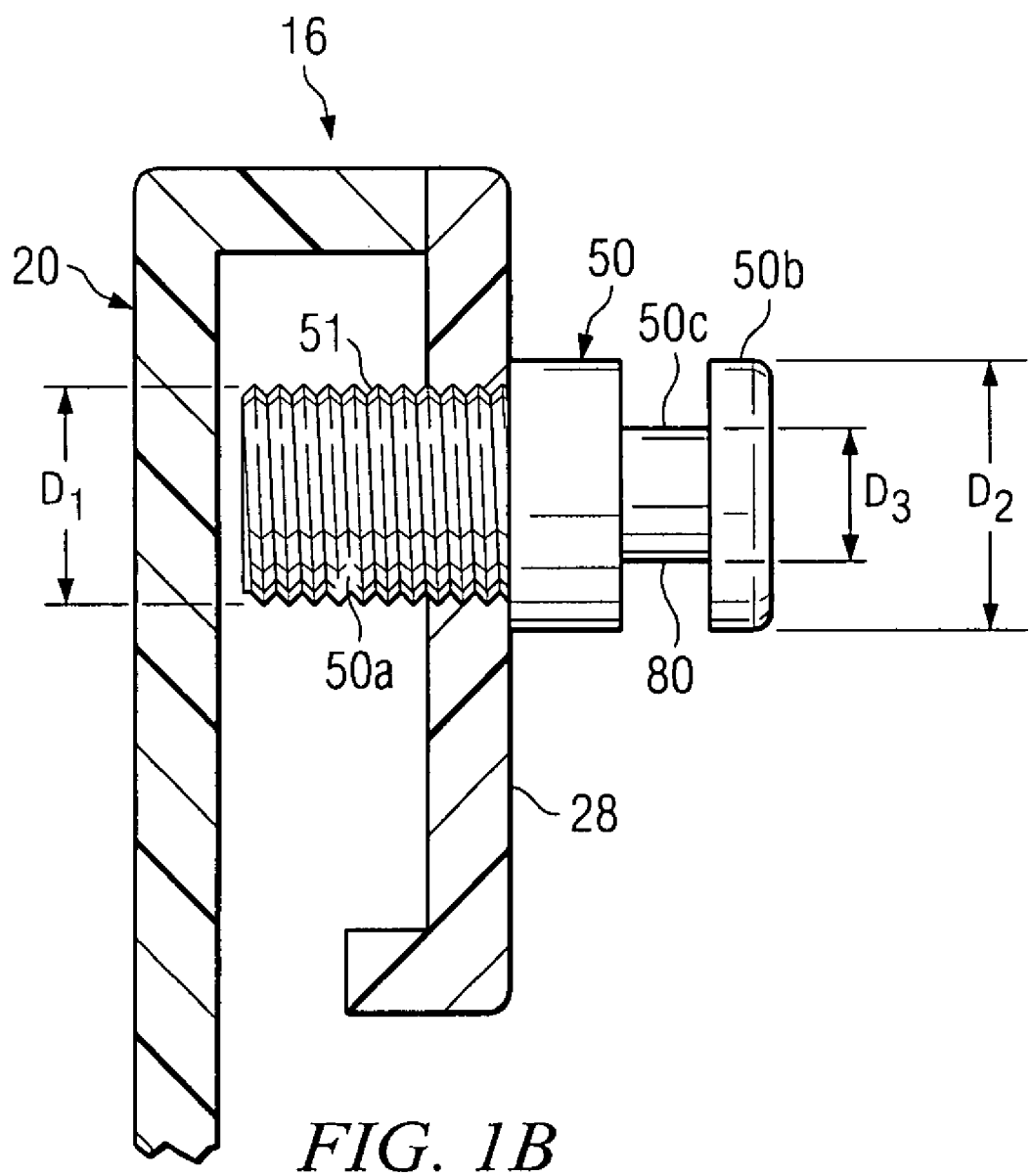
FIG. 1B is diagram of a section view of a portion of the electronic device of FIG. 1A taken along the line 1B-1B of FIG. 1A.

FIG. 1B is diagram of a section view of electronic device 10 taken along the line 1B-1B of FIG. 1A. In the embodiment illustrated in FIG. 1B, post 50 comprises a base portion 50a, a cap 50b and an intermediate portion 50c disposed between base portion 50a and cap 50b. In the embodiment illustrated in FIG. 1B, base 50a and cap 50b each comprise diameters D1 and D2 larger than diameter D3 of intermediate portion 50c such that intermediate portion D3 forms an annular recess 80 engagable to releasably secure post 50 in a particular position. Accordingly, post 50 is configured generally in the shape of an "I"; however, it should be understood that post 50 may be otherwise configured such as, for example, "T"-shaped such that cap 50b comprises a diameter D2 larger than the diameters D1 and D3 of base portion 50a and intermediate portion 50c, respectively.

According to the embodiment illustrated in FIG. 1B, bezel 28 is secured to housing 20 of display member 16 via post 50. For example, in FIG. 1B, base portion 50a comprises a threaded exterior surface 51 for engagement with bezel 28 and housing 20 of display member 16 to secure bezel 28 to display member 16. Accordingly, post 50 forms a part of locking system 12 while also functioning to secure bezel 28 to display device 16, which obviates the need for a separate and dedicated screw/connector for bezel 28. It should be understood that other methods of attaching post 50 to display member 16 are available, such as, but not limited to, frictionally attaching post 50 to display member 16. While post 50 is illustrated and described in connection with FIG. 1B, it should be understood that post 48 is configured in a similar manner.

Figure 2:
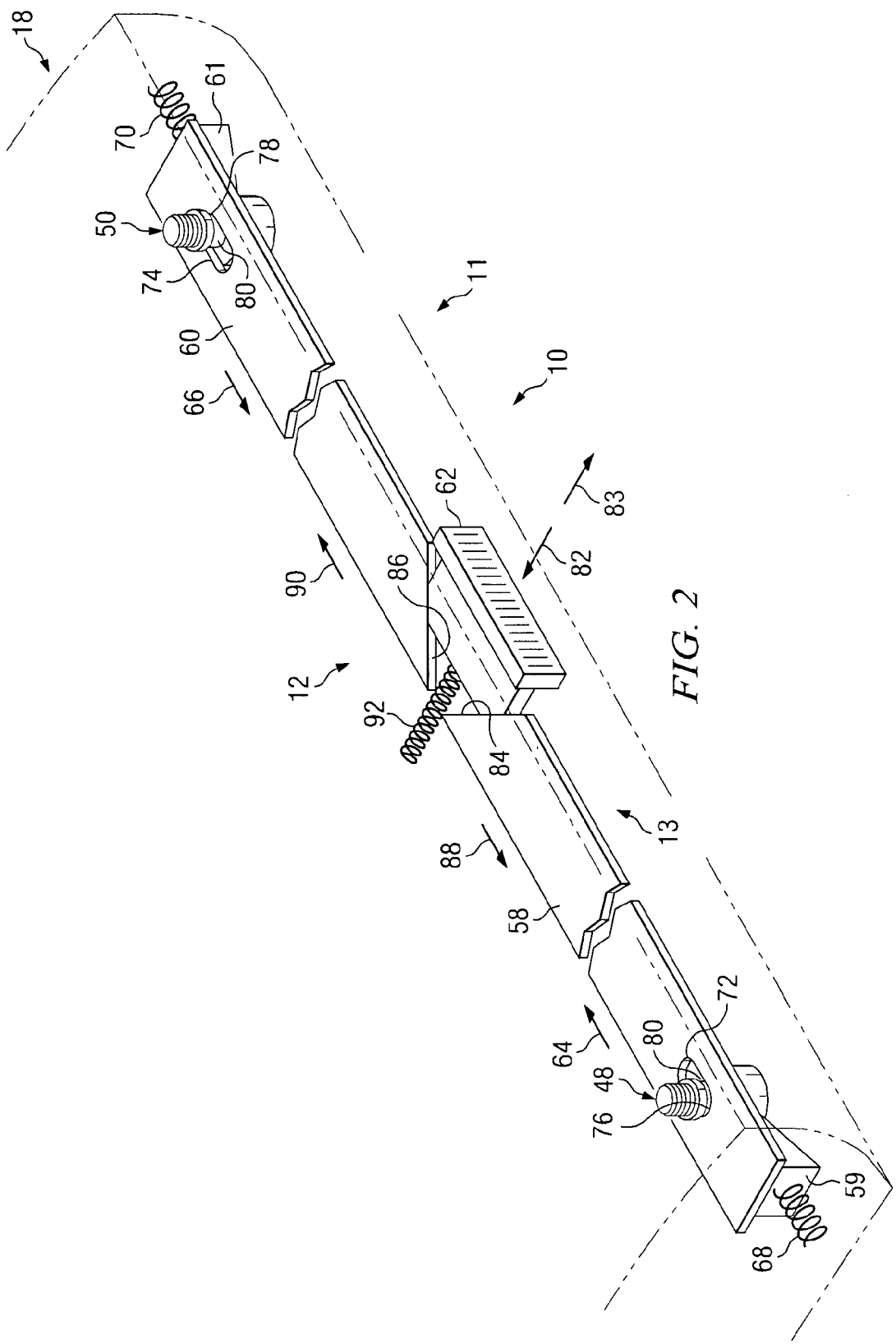
FIG. 2 is a diagram illustrating a detail view of a portion of the locking system of FIGS. 1A and 1B.

FIG. 2 is a diagram illustrating a portion of locking system 12 disposed in base member 18 of FIGS. 1A and 1B. In the embodiment illustrated in FIG. 2, locking system 12 comprises a latch 13 comprising a pair of slider arms 58 and 60 movable in response to actuation of a latch button 62. Slider arms 58 and 60 each comprise outwardly extending extensions 59 and 61, configured to engage biasing mechanisms 68 and 70, respectively. In the embodiment illustrated in FIG. 2, biasing mechanisms 68 and 70 exert forces on extensions 59 and 61, respectively, to inwardly bias slider arms 58 and 60 in the directions of arrows 64 and 66. Slider arms 58 and 60 each comprise slots 72 and 74 configured to receive posts 48 and 50, respectively. In FIG. 2, slider arms 58 and 60 are inwardly biased such that the edges 76 and 78 of openings 72 and 74, respectively, are inserted within annular recesses 80 to secure posts 48 and 50 within openings 72 and 74 to secure display member 16 to base member 18. Thus, in FIG. 2, locking system 12 is illustrated in a locked position to securely fasten display member 16 in a fixed position relative to base member 18. It should be understood that latch 13 may be otherwise configured to engage posts 48 and 50 to secure display member 16 to base member 18. For example, latch 13 may reside on a single side of post 48 and/or 50 and engage and disengage annular recesses 80 via back and for the movement in the directions indicated by arrows 82 and 83. Furthermore, it should be understood that annular recesses 80 may be otherwise configured (e.g., configured to extend partially around a circumference of posts 48 and 50).

In operation, in response to button 62 being depressed or otherwise actuated in the direction of arrow 82, latch 13 is moved to an unlocked position. For example, button 62 exerts a force on angled surfaces 84 and 86 of slider arms 58 and 60, respectively, to move slider arms 58 and 60 in the directions of arrows 88 and 90, thereby compressing biasing mechanisms 68 and 70. Movement of slider arms 58 and 60 positions and/or otherwise moves edges 76 and 78 outwardly from recesses 80 to facilitate removal of posts 48 and 50 from openings 72 and 74, respectively, to enable release of display member 16 from base member 18. In the embodiment illustrated in FIG. 2, as button 62 is released, a biasing mechanism 62 outwardly biases button 62 in the direction of arrow 93 to return button 62 to its unactuated position.

Figure 3A:
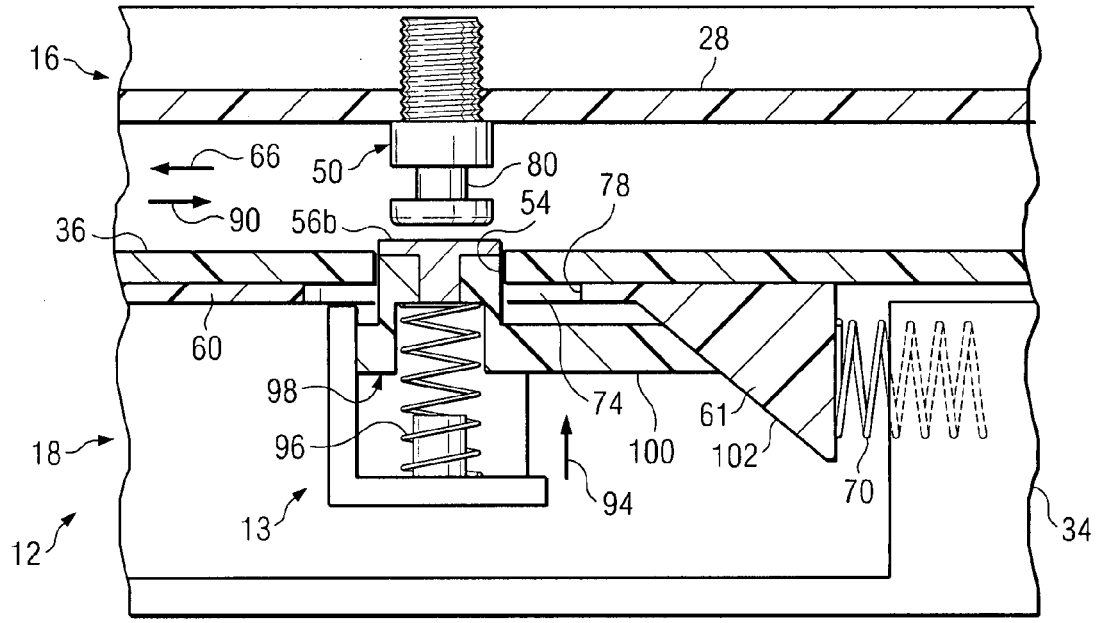
FIG. 3a is a diagram illustrating a portion of the locking system of FIGS. 1A, 1B and 2 in an extended position.
Figure 3B:
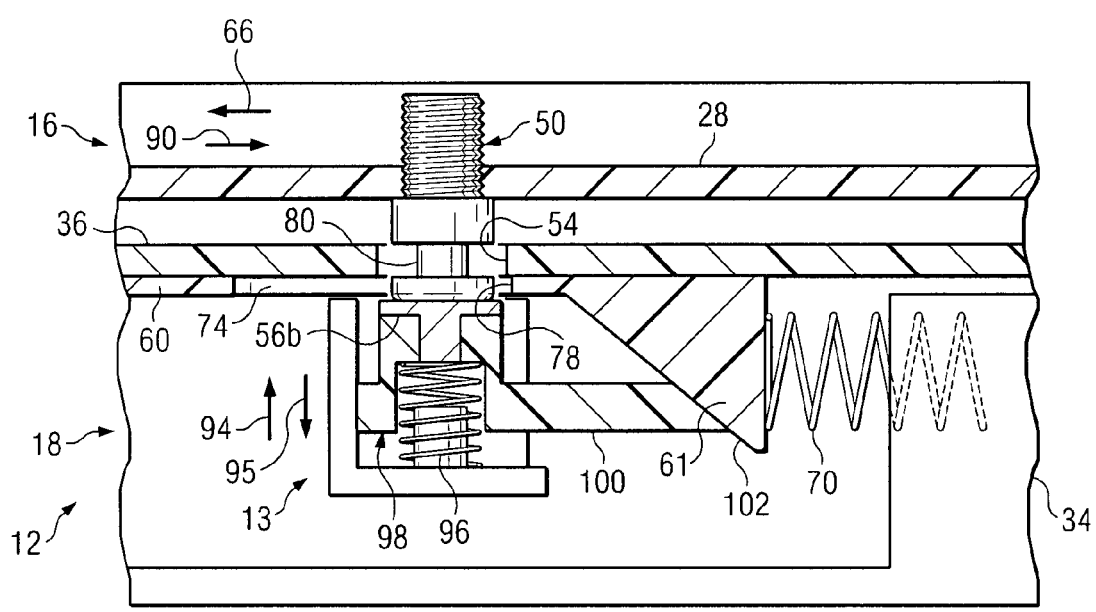
FIG. 3b is a diagram illustrating the locking system of FIG. 3a in a partially retracted position.
Figure 3C:
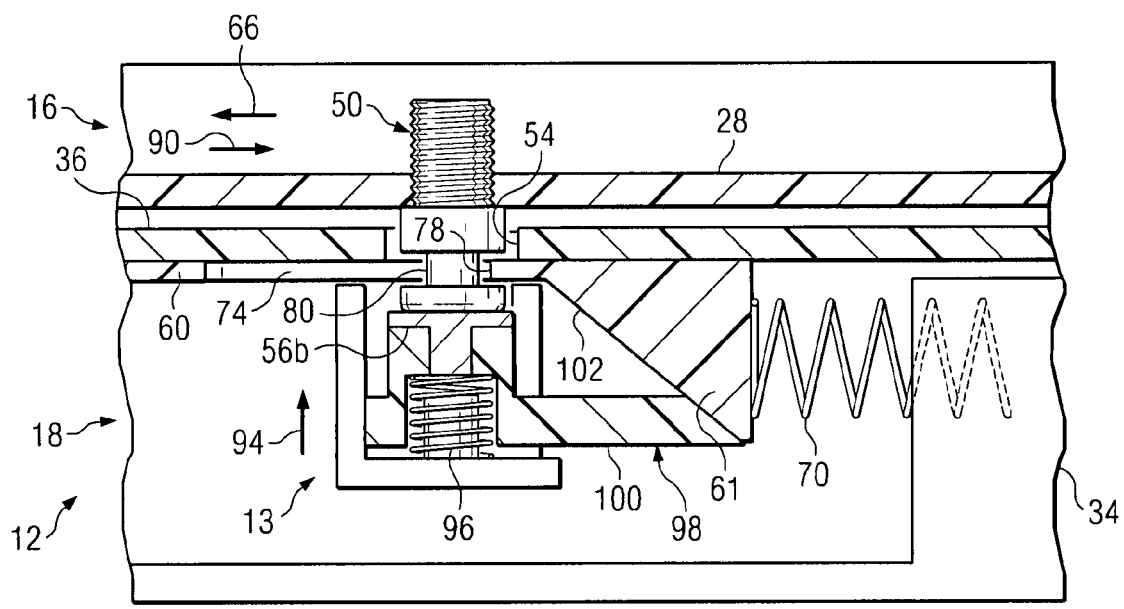
FIG. 3C is a diagram illustrating the locking system of FIG. 3a in a fully retracted position.

FIG. 3A is a diagram illustrating a portion of locking system 12 of FIGS. 1A and 1B in which cap 56b is illustrated in an extended position (e.g., cap 56b is flush or substantially flush with working surface 36 and encloses opening 54). FIG. 3B is a diagram illustrating locking system 12 of FIG. 3A in a partially retracted position (e.g., cap 56b partially retracted within housing 34). FIG. 3C is a diagram illustrating locking system 12 of FIG. 3A in a fully retracted position (e.g., cap 56b positioned below slider arm 60 to enable movement of slider arm 60 in the directions of arrows 66 and 90). While slider arm 60 is only illustrated in FIGS. 3A-3C, it should be understood that slider arm 58 operates in a similar manner.

In the embodiment illustrated in FIGS. 3A-3C, cap 56b is upwardly biased in the direction of arrow 94 by a biasing mechanism 96. In FIGS. 3A-3C, cap 56b is disposed on a cap support member 98 having an arm 100 slideably engagable with a ramp 102 disposed on extension 61 of slider arm 60. In the embodiment illustrated in FIG. 3A, biasing mechanism 96 exerts a force on cap support member 98 in the direction of arrow 94, thereby causing arm 100 to slideably engage ramp 102 to urge arm 60 in the direction of arrow 90, thereby compressing biasing mechanism 70. In response to urging of slider arm 60 in the direction of arrow 90, groove 74 is aligned with post 50 to enable insertion of post 50 therethrough.

In the embodiment illustrated in FIG. 3B, as display member 16 is transitioned in the direction of arrow 95 toward base member 18, post 50 contacts and otherwise exerts a force on cap 56b to force cap 56b to a retraced position below working surface 36 and inside housing 34. In response to retraction of cap 56b, cap support member 98 compresses biasing mechanism 96 to enable movement/lowering of arm 100 in the direction of arrow 95. In response to lowering of arm 100, biasing mechanism 70 exerts a force on extension 61 of slider arm 60 to gradually urge slider arm 60 in the direction of arrow 66. Accordingly, as arm 100 moves downward, the engagement and/or or movement of arm 100 along ramp 102 enables biasing mechanism 70 to urge slider arm 60 in the direction of arrow 66.

In the embodiment illustrated in FIG. 3C, as post 50 is inserted within opening 54, biasing mechanism 70 urges slider arm 60 such that edge 78 of opening 74 is inserted within recess 80 of post 50 to secure display member 16 to base member 18 to prevent movement of display member 16 in the direction of arrow 94. While display member 16 is secured to base member 18, biasing mechanism 70 continuously urges slider arm 60 in the direction of arrow 66 to continuously position edge 78 inside recess 80 such that latch 13 securely fastens display member 16 to base member 18. To unlock latch 13 and release display 18 from base member 16, button 62 (FIG. 2) is actuated to cause slider arm 60 to move in the direction of arrow 90 to remove edge 78 from recess 80 to facilitate removal of posts 48 and 50, respectively, from housing 34.

According to some embodiments, upon actuation of button 62, latch 13 automatically separates and/or lifts display member 16 a predetermined distance from base member 18 to facilitate opening thereof by a user. For example, when button 62 is actuated to remove edge 78 from within recess 80, the potential energy stored by biasing mechanism 96 forces movement of support system 98 and, thus, post 50 in the direction of arrow 94, which raises/lifts display member 16 away from base member 18 a predetermined distance to enable a user to easily grip and rotate display member 16 to the open position. Furthermore, when transitioning display member 16 toward base member 18 to secure display member 16 to base member 18, latch 13 prevents and/or substantially reduces the likelihood of abrupt contact between display member 16 and base member 18 by decelerating movement of display member 16. For example, biasing mechanism 96 exerts a biasing force on support system 98 such that as post 50 contacts cap 56b, biasing mechanism 96 is compressed and stores potential energy therein, thereby resisting the movement of display member 16 toward base member 18 and substantially reducing or eliminating the likelihood of abrupt contact between display member 16 and base member 18.

Thus, embodiments provide a latch 12 comprising posts 48 and 50 extending outwardly from display member 16 to enable electronic device 10 to be securely fastened in a closed position. Posts 48 and 50 are configured to extend outwardly from display member 16 to reduce and/or eliminate the likelihood of foreign objects, such as clothing or jewelry, catching onto posts 48 and 50. Furthermore, posts 48 and 50 are coupleable to display member 16 to enable bezel 28 to be secured to display device 16 without requiring additional and/or dedicated attachment mechanisms.

What is claimed is:

1. An electronic device locking system, comprising:
    a display member coupled to a base member to enable variable positioning of the display member relative to the base member;
    a retractable cap located in an opening in the base member; and
    a post forcing the retractable cap into the opening to engage with a latch to secure the display member in a fixed position relative to the base member, wherein an end of the post contacts an end of the retractable cap to push the cap retractable from a position flush with a working surface of the base member to a position located within the opening.

2. The system of claim 1, wherein the retractable cap is substantially flush with a working surface of the base member when the display member is in an open position.

3. The system of claim 1, wherein the retractable cap is biased in an extended position when the display member is in an open position and positioned against a movable arm of the latch.

4. The system of claim 1, wherein the retractable cap conceals the opening to prevent debris from entering the opening.

5. The system of claim 1, wherein the retractable cap is biased with a spring and moves within the opening.

6. The system of claim 1, further comprising a first spring that biases the retractable cap in the opening, and a second spring that biases an arm of the latch against the retractable cap when the display member is in an open position and against the post when the display member is in a closed position.

7. The system of claim 6, wherein the base of the post is coupleable to a housing of the display member to secure a bezel to the display member.

8. The system of claim 6, wherein the intermediate portion comprises a recessed area to engage at least a portion of the latch.

9. The system of claim 1, wherein the latch biases the display member away from the base member.

10. A method of manufacturing an electronic device locking system, comprising:
    coupling a display member to a base member to enable variable positioning of the display member relative to the base member;
    providing a retractable cap that covers an opening; and
    providing a post that moves the retractable cap in the opening to engage with a latch to secure the display member in a fixed position relative to the base member, wherein the retractable cap conceals the opening to prevent debris from entering the opening.

11. The method of claim 10, the retractable cap is substantially flush with a working surface of the base member when the display is in an open position.

12. The method of claim 10, wherein the retractable cap is biased in an extended position when the display member is in an open position and positioned against a movable arm of the latch.

13. The method of claim 10, wherein an end of the post contacts an end of the retractable cap to push the cap retractable from a position flush with a working surface of the base member to a position located within the opening.

14. The method of claim 10, wherein the retractable cap is biased with a spring and moves within the opening.

15. An electronic device locking system, comprising:
    a display member coupled to a base member to enable variable positioning of the display member relative to the base member;
    a retractable cap biased within an opening; and
    at least one post configured to secure a bezel to the display member, the at least one post forcing the retractable cap into the opening and engaging with a latch secure the display member in a fixed position relative to the base member.

16. The system of claim 15, wherein the retractable cap is substantially flush with a working surface of the base member when the display member is in an open position and retracted in the opening by the post when the display member is in a closed position.

17. The system of claim 16, wherein an end of the post contacts an end of the retractable cap to push the cap retractable from a position flush with a working surface of the base member to a position located within the opening, and a spring biases an arm of the latch into engagement with the post, wherein the retractable cap conceals the opening to prevent debris from entering the opening.

\* \* \* \* \*

UNITED STATES PATENT AND TRADEMARK OFFICE
CERTIFICATE OF CORRECTION

PATENT NO. : 7,609,514 B2
APPLICATION NO. : 11/786402
DATED : October 27, 2009
INVENTOR(S) : Paul J. Doczy et al.

It is certified that error appears in the above-identified patent and that said Letters Patent is hereby corrected as shown below:

In column 5, line 34, in Claim 11, delete "the" and insert -- wherein the --, therefor.

In column 6, line 20, in Claim 15, after "latch" insert -- to --.

Signed and Sealed this

Sixteenth Day of March, 2010

David J. Kappos
*Director of the United States Patent and Trademark Office*